United States Patent
Rodriguez et al.

(10) Patent No.: US 9,336,780 B2
(45) Date of Patent: May 10, 2016

(54) IDENTIFICATION OF A LOCAL SPEAKER

(75) Inventors: Luis Buera Rodriguez, Madrid (ES); Carlos Vaquero Aviles-Casco, Madrid (ES); Marta Garcia Gomar, Madrid (ES)

(73) Assignee: AGNITIO, S.L., Madrid (ES)

( * ) Notice: Subject to any disclaimer, the term of this patent is extended or adjusted under 35 U.S.C. 154(b) by 102 days.

(21) Appl. No.: 14/127,073

(22) PCT Filed: Jun. 20, 2011

(86) PCT No.: PCT/EP2011/003034
§ 371 (c)(1),
(2), (4) Date: Jan. 24, 2014

(87) PCT Pub. No.: WO2012/175094
PCT Pub. Date: Dec. 27, 2012

(65) Prior Publication Data
US 2014/0379332 A1    Dec. 25, 2014

(51) Int. Cl.
*G10L 21/00* (2013.01)
*G06F 17/20* (2006.01)
*G10L 19/00* (2013.01)
*G10L 17/02* (2013.01)
*G10L 17/00* (2013.01)
(Continued)

(52) U.S. Cl.
CPC ............... *G10L 17/02* (2013.01); *G10L 17/00* (2013.01); *G10L 17/06* (2013.01); *G10L 17/12* (2013.01); *G10L 19/038* (2013.01); *G10L 19/12* (2013.01); *G10L 25/78* (2013.01); *G10L 15/30* (2013.01); *G10L 25/12* (2013.01); *G10L 25/24* (2013.01)

(58) Field of Classification Search
None
See application file for complete search history.

(56) References Cited

U.S. PATENT DOCUMENTS

| | | | | |
|---|---|---|---|---|
| 8,571,865 | B1* | 10/2013 | Hewinson | G10L 17/06 704/236 |
| 8,639,502 | B1* | 1/2014 | Boucheron | G10L 21/02 381/94.1 |
| 2003/0004720 | A1* | 1/2003 | Garudadri | G10L 15/30 704/247 |
| 2009/0157400 | A1* | 6/2009 | Huang | G10L 15/20 704/234 |
| 2011/0276323 | A1 | 11/2011 | Seyfetdinov | |

FOREIGN PATENT DOCUMENTS

| WO | WO-2007057879 A1 | 5/2007 |
|---|---|---|
| WO | WO-2011066844 A1 | 6/2011 |

OTHER PUBLICATIONS

Vivaracho et al., "Remote Access Control by Means of Speech", p. 187-190, 1999 IEEE.

(Continued)

*Primary Examiner* — Marcus T Riley
(74) *Attorney, Agent, or Firm* — Marshall, Gerstein & Borun LLP

(57) ABSTRACT

Method for speaker identification includes detecting a target speaker's utterance locally; extracting features from the detected utterance locally, analyzing the extracted features in the local device to obtain information on the speaker identification and/or encoding the extracted features locally, transmitting the encoded extracted features to a remote server, decoding and analyzing the received extracted features by the server to obtain information on the speaker identification, and transmitting the information on the speaker identification from the server to the location where the speaker's utterance was detected. The method further includes detecting speech activity locally. Extracting features, encoding the extracted features, and/or transmitting the encoded extracted features to the server, are only performed if speech activity above some predetermined threshold is detected.

13 Claims, 3 Drawing Sheets

(51) Int. Cl.
*G10L 25/78* (2013.01)
*G10L 17/06* (2013.01)
*G10L 17/12* (2013.01)
*G10L 19/038* (2013.01)
*G10L 19/12* (2013.01)
*G10L 15/30* (2013.01)
*G10L 25/12* (2013.01)
*G10L 25/24* (2013.01)

(56) References Cited

OTHER PUBLICATIONS

Vogt et al., "Minimising Speaker Verification Utterance Length through Confidence Based Early Verification Decision", p. 454, ICB 2009.
International Search Report for Application No. PCT/EP2011/003034, dated Feb. 3, 2012.

\* cited by examiner

IDENTIFICATION OF A LOCAL SPEAKER

CROSS-REFERENCE TO RELATED APPLICATION

The present application is the United States national phase of International Patent Application No. PCT/EP2011/003034, filed Jun. 20, 2011. The priority application, PCT/EP2011/003034, is incorporated herein by reference.

FIELD OF THE DISCLOSURE

The present invention relates to the art of automatic speaker identification, in particular, identification of a local speaker in the case of limited response time or computational resources at the location where a speaker's voice is detected.

BACKGROUND OF THE INVENTION

Speaker identification may be requested for a number of different criminal offences, such as making hoax emergency calls to the police, ambulance or fire brigade, making threatening or harassing telephone calls, blackmail or extortion demands, taking part in criminal conspiracies, etc. According to another example, screening of incoming telephone calls is performed in order to alert staff of a call center when a known speaker is on the line or to automatically block that known speaker.

Conventionally, a new speech sample of an unknown speaker of a new incoming telephone call is analyzed in order to determine whether or not the speech sample matches one or more stored samples of already identified speakers. It is determined whether the new speech sample matches one or more known ones to a predetermined degree defined in terms of some distance measure or similarity metrics. For example, Gaussian Mixture Model metrics can be employed to determine whether a Gaussian Mixture Model derived for the new speech sample of the unknown speaker has a distance to Gaussian Mixture Models derived for already identified known speakers below some predetermined threshold. Particularly, the well-known Kullback-Leibler distance can be used.

However, automatic speaker identification presents a very demanding task in terms of response time and computer resources. In some cases, the speed is important because we have to act according the identification as soon as possible. In other cases, the faster the response, more comparisons can be done. Also, in some situations, only limited computer resources are available locally, i.e. at the location where a target speaker's voice is detected. For example, some call center outposts are not equipped with high-performance computers but rather only with resources sufficient for handling calls. According to another example a mobile device, for example, a mobile phone or PDA, may be equipped, for instance, based on some App program, for speaker identification. In this case, only limited memory and CPU power is available. If, however, only limited resources are available, reliable speaker identification could be more difficult.

Thus, it is an object of the present invention to provide a method for the identification of a speaker whose verbal utterance is detected at a location where only limited computational resources are available wherein the method shall allow for fast response times for the identification process.

SUMMARY OF THE DISCLOSURE

In view of the above, the present invention provides a method for speaker identification. This method comprises the steps of detecting a (target) speaker's utterance locally;
extracting features from the detected utterance locally;
A) analyzing the extracted features in the local device to obtain information on the speaker identification and/or:
B) encoding the extracted features locally; transmitting the encoded extracted features to a (remote) server; decoding and analyzing the received extracted features by the server to obtain information on the speaker identification; and transmitting the information on the speaker identification from the server to the location where the speaker's utterance was detected;

and further comprising detecting locally speech activity and wherein the steps of extracting features and/or encoding the extracted features and/or transmitting the encoded extracted features to the server are only performed, if speech activity above some predetermined threshold is detected.

Besides the locally encoded extracted features, in principle, some other features could additionally be transmitted, such as, quality measures, speech time marks, etc.

According to an example of the invention, the local device could provide speaker identification results under certain conditions e.g., reduced number of models, reduced bandwidth, etc. However, in some cases it could be needed to use a server. In these situations, the features should be coded and transmitted to the server. In principle, it could even be possible to run the speaker identification engine in the local device and in the server.

In addition, the method may comprise encoding parts of the locally detected speaker's utterance (parts of the speech sample obtained locally) and transmitting the encoded parts to the server. The speaker's utterance may be locally detected by a local (for example, mobile) device carried by a user, for example, a mobile phone or Personal Digital Assistant, and in this case the encoded extracted acoustic features are transmitted to the server by the local (for example, mobile) device, if it is required. It is noted that the speaker's utterance corresponds to a speech signal that, in principle, comprises both verbal parts (for example, spoken words; phonemes or syllables) comprising semantically meaningful information and non-verbal parts (for example, noise).

According to the inventive method the processing for speaker identification is performed locally or by the server remotely located with respect to the location where the speaker's utterance is detected. The local identification only can be done under certain circumstances depending on the SID configuration, the local device and the nature of the comparisons pretended to be done. On the other hand, if the SID has to be computed in the server, the main demand for computer resources is, therefore, addressed to the remote server rather than a locally provided device that would be configured for detecting the speaker's utterance and extracting features from the same. As mentioned previously, in principle, it would be possible to run the SID engine in the capture device and in the server. In particular, according to an example the server is only working on the task of speaker identification, if speech activity above some predetermined threshold is detected. Thereby, it is avoided that periods of silence or pure perturbations in the detected speech utterance are encoded or transmitted and, thus, the demand for the bandwidth of the transmission from the local device to the server can significantly be reduced.

The speaker identification can be performed by the server based on the received extracted features or both on the already locally extracted features and on features extracted by the server from encoded speech samples received from the local device, if the available transmission bandwidth is sufficiently high. The speaker identification, in principle, can be performed by the server in accordance with any method known in the art. If the speaker identification is achieved locally, the configuration should be defined according to the device characteristics. In any case, the server or the local device can compare the features with samples stored in a database obtained during a training phase in order to determine whether or not the speaker's utterance can be matched to a known speaker's utterance.

The extracted features may be present in form of feature (characteristic) vectors comprising parameters as, e.g., formants, the pitch, the mean power and the spectral envelope, that are characteristic for received speech signals. In particular, the features may comprise MEL frequency cepstral coefficients. The extracted features may also comprise already processed acoustic feature vectors or parameters and, thus, some intermediate recognition results. It should be noted that according to the invention not only the main computational load is shifted to the server but also the amount of data to be transmitted by the local device detecting the speaker's utterance to the server can be minimized. For this purpose, it has been proven valuable to extract and transmit the MEL frequency cepstral coefficients, in particular, in encoded form. The bandwidth necessary for the transmission of data to the server for speaker identification can thereby be significantly reduced. Moreover, the computational time needed for the processing of the speaker's utterance in the local (mobile) device can be kept short when concentrating on the extraction of the MEL frequency cepstral coefficients.

In order to save bandwidth for the transmission of data to the server, the extracted features can be encoded by vector quantization and/or linear prediction. For example, combined vector quantization and linear prediction in form of Differential Vector Quantization of acoustic feature vectors may be employed. Differential vector quantization is well known in the art, see for example, "Real-Time video Compression Using Differential Vector Quantization", by Fowler, Adkins, Bibyk and Stanley, IEEE trans., on circuits and systems for video technology, vol 5, No. 1, February 1995, pages 14 to 24. According to another example, not only speech activity is detected but further local babble noise (verbal noise generated in the foreground or background by other speakers than the target speaker) is detected and the steps of extracting features and/or using for SID in the local device and/or encoding the extracted features and/or transmitting the encoded extracted features and/or encoded parts of the locally detected speaker's utterance to the server are only performed, if babble noise below some predetermined threshold is detected.

As already mentioned detecting the speaker's utterance locally, extracting the features from the detected utterance locally and encoding the extracted features locally can be performed by a local device carried by a user. The method may further comprise canceling a verbal utterance of the user detected by the local device before the step of extracting the features from the detected utterance. Thereby, speaker identification can be more reliably performed and the data to be transmitted to the server can be reduced. The cancellation of the voice input of the user can be carried out by echo cancellation means known in the art. According to an example, the local device may comprise or be connected with two microphones. One microphone is primarily used to detect a verbal utterance of a target speaker, while the other one is used to detect speech of the user of the local device. The signals obtained by that microphone, for example, a close-talk microphone, can be used to cancel voice of the user detected by the (far-field) microphone that is primarily used to detect a verbal utterance of the target speaker. In order to cancel a verbal utterance of the user detected by the local device it is also contemplated to use feature vector normalization techniques. Another option would be to use several microphones to capture the audio of the suspect. Using beamforming techniques, the power of the user speech recorded should not be reduced.

The speaker identification in the above-described examples can be based on comparison of features with samples stored in a database. In the art, in the sample matching process a scored N best list of matches (open set verification) is generated and the maximum score identifies the best-matching sample. According to an example of the present inventive method, however, analyzing the received extracted features by the local device or the server to obtain information on the speaker identification comprises matching the received extracted features and/or features extracted by the local device or the server from parts of the speaker's utterance with samples of a database;

determining the maximum score of the best matching sample;

determining the difference of the maximum score, the average of other scores obtained for other samples of the database and the standard deviation of the other scores; and identifying the speaker based on the determined difference of the maximum score, the average of other scores obtained for other samples of the database and the standard deviation of the other scores Considering that the scores have a certain distribution i.e., Gaussian, some techniques can be applied in order to determine that the highest score is not represented by the distribution, for example, Gaussian measures. Other outlier detection techniques known in the art can be applied.

Thus, contrary to the art not only the maximum score but also the difference of the same to other scores as well as the standard deviation of the other scores are taken into account in order to identify a speaker (for details see description below). Thereby, the reliability of the speaker identification process is increased. However, the time needed for the speaker identification may prove a crucial point. In order to accelerate the speaker identification process some confidence measure associated with a particular score may be employed. Thus, in the above-described examples of the inventive method the step of analyzing the received extracted features by the server or the local device to obtain information on the speaker identification may comprise matching the (received) extracted features and/or features extracted from parts of the speaker's utterance with samples of a database;

determining scores for the matched samples (in particular, for portions of the utterance); and determining confidence levels for the determined scores during the determination of the same, wherein the process of determining a score is terminated, if the associated confidence level exceeds some predetermined threshold.

Thereby, time needed for speaker identification can significantly be saved. It should be noted that in an open-set identification task (determining whether a speaker's sample corresponding to a detected speaker's utterance is stored in a database and finding the corresponding record rather than single speaker verification) each score can be treated as the maximum score in the sense that for each score the average of other scores obtained for other samples of the database and the standard deviation of the other scores are determined and the final decision is made when the confidence intervals representing the confidence levels related to all of the identification scores are above or below some threshold (see, again, detailed description below). Note that in this case we are looking at the convergence of the outlier detection measure.

Other options could also be applied, such as using the same scheme as single speaker verification for each model and wait until the convergence for all the models.

Furthermore, according to another example more than one speaker can be identified. In this case, for each speaker under test the scores have to be grouped. If for a detected speech signal that may comprise utterances of different speakers (even after subtracting a speech contribution coming from a user of the local device) the time needed for assigning a score decreases from frame to frame it is assumed that the speech signal belongs to the same speaker whereas when the time increases some diarization has to be performed before speaker clustering.

Herein, it is also provided a system for speaker identification, comprising a server;

a local device comprising a controller and configured for detecting locally speech activity and/or determining quality measures (for example, signal-to-noise ratio or energy measures);

detecting a speaker's utterance locally;

extracting features from the detected utterance locally;

encoding the extracted features locally; and transmitting the encoded extracted features to the server;

wherein the controller is configured to initiate the extracting of the features and/or running the SID system and/or encoding of the extracted features locally and/or transmitting of the encoded extracted features to the server, only if speech activity (in the detected utterance) above some predetermined threshold is detected and/or the determined quality measures satisfy predetermined conditions;

wherein the server is configured for decoding and analyzing the received extracted features to obtain information on the speaker identification; and transmitting the information on the speaker identification to the local device.

The controller may also be configured for analyzing the received extracted features to obtain information on the speaker identification.

In the system all of the above-described examples of the method for speaker identification can be implemented. In particular, the local device can be a mobile device, in particular, a mobile phone or Personal Digital Assistant. The above-described systems are particularly useful for call center. Thus, the system may be comprised in a call center.

Additional features and advantages of the present invention will be described with reference to the drawing. In the description, reference is made to the accompanying figures that are meant to illustrate examples of the invention. It is understood that such an example does not represent the full scope of the invention.

DETAILED DESCRIPTION OF THE PREFERRED EMBODIMENTS

Figure 1:
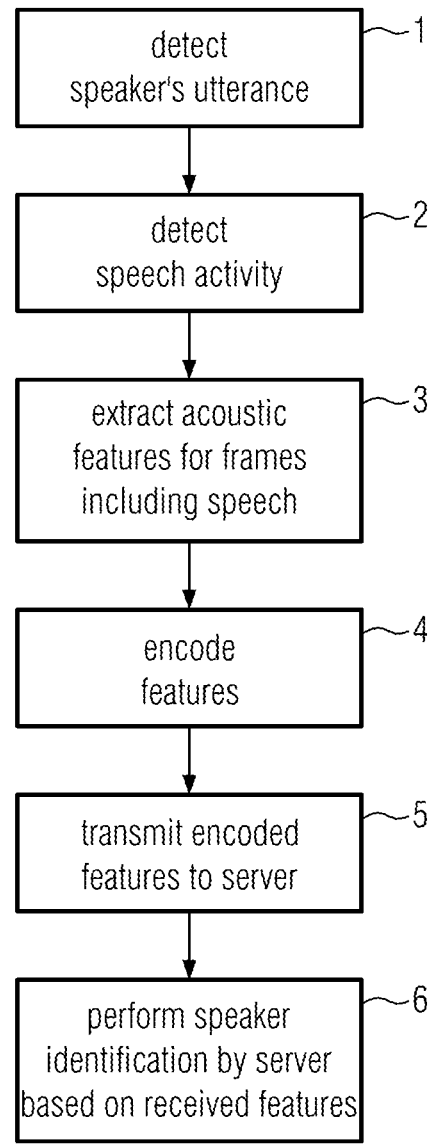
FIG. 1 represents a flow chart illustrating an example of the inventive method for speaker identification comprising the local detection of a speaker's utterance by a local device and the transmission of encoded features extracted from the utterance by the local device to a remote server, if the detected speech activity exceeds some predetermined threshold. Also it is included the option to do the speaker identification in the mobile device.

As shown in FIG. 1 according to an example of the present invention a speaker's utterance is locally detected ("Detect utterance") by a local device, for example, a mobile phone. For example, sample of 16 bits at a sampling frequency of 8 kHz are obtained that usually comprise speech and speech pauses. Next, speech activity of the samples is detected ("VAD") and frames including speech (i.e. the detected speech activity exceeds some predetermined threshold) are subject to a feature extraction ("Front End"). Feature extraction results in feature vectors comprising parameters as, for example, the MEL frequency cepstral coefficients. Other features that might be transmitted are VAD labels, the SNR and (energy) saturation values per frame. Further features comprise intermediate recognition results obtained by some processing of acoustic feature vectors. In principle, it is also possible to transmit extracted features for all portions of the utterance including non-verbal parts, for example, all MEL frequency cepstral coefficients. With respect to the transmission efficiency it might be preferred to transmit extracted features for a predetermined number of frames showing at least some predetermined quality (for example, in terms of the signal-to-noise ratio). The next step is to remove the user speech that can be included in the features ("Source separation"). The high quality segments are extracted to be used. Then, if the recording device is powerful enough, the SID is carried out there ("MS/SID/ED"), if not, the segments are encoded ("Coding") and transmitted by the capture device. In order to save transmission bandwidth the features are encoded ("Coding") and the encoded features are transmitted wirelessly to a server for further analysis. The encoding may be performed in form of Differential Vector Quantization wherein, for example, 14 cepstral coefficients can be encoded to require for only a bandwidth of some 2.5 kbps.

The speaker identification may particularly be based on some confidence level lower than 100% as it is described below. In principle, the local device, depending on the available bandwidth, may additionally transmit (encoded) speech frames for a separate feature extraction done by the server. In this case, the server may use both the features received from the local device and the ones extracted at the server side from the received speech frames in order to fulfill the task of speaker identification.

According to an example, verbal utterances not coming from the (target) speaker but from a user carrying the local device are subtracted from the speech samples obtained by the local device before feature extraction or features of the same are subtracted from the extracted features corresponding to the target speaker's utterance. Consider a situation in that a user carrying the local device is talking with a target speaker. The local device may comprise a far-field microphone for detecting an utterance of the target speaker and may be connected to a close-talk microphone for detecting utterances from the user. The total MEL frequency cepstral coefficients (MFCC) frame $z_t$ obtained by the far-field microphone can be modeled as the sum of the (MFCC) frame of the target speaker $x_t$ and the user's speech frame $w_t$ affected by the transfer (response) function from the mouth of the speaker to the location of the far-field microphone. This MFFC $w_t$ can be considered a transformation of the MFCC frame $y_t$ of the user's speech detected by the close-talk microphone.

The purpose is now to normalize $z_t$ such that the user's contribution is removed from the MFCC frame $z_t$ obtained by the far-field microphone. This approach requires a training process based on stereo data. In the training process two frames are obtained: $y_{t,train}$ is recorded from the close-talk microphone and $w_{t,train}$ is recorded with the far-field microphone. The close-talk features are modeled by means of an appropriate Gaussian Mixture Model. Applying Expectation Maximization gives the transformation $$R_G = \frac{\sum_t p(g \mid y_{t,train}) w_{t,train}}{\sum_t p(g \mid y_{t,train})}$$

with p(g|y) being the a posteriori probability of the Gaussian g for a given feature vector y. Accordingly, the contribution of the close-talk frames when both the user and the target speaker are simultaneously talking can be removed as $$\hat{x}_t = z_t - \sum_g p(g \mid y_t) r_g.$$

The previous proposed solution works on feature domain and it is based on MEMLIN framework (Buera, L., Saz, O., Lleida, E., Miguel, A., & Ortega, A. (2007). Cepstral Vector Normalization Based on Stereo Data for Robust Speech Recognition. IEEE Transactions On Audio Speech And Language Processing, 15(3), 1098-1113), although more complex acoustic model can be estimated, modifying the classic MEMLIN framework to estimate $x_t$ given jointly $z_t$ and $y_t$. Note that more options can be applied, such as VTS, Vector Taylor Series (P J Moreno, Speech Recognition in Noisy Environments, Ph.D. Thesis, Carnegie Mellon University, 1996), which could be applied also in the feature domain. In the Ph.D. Thesis by PJ Moreno, Speech Recognition in Noisy Environments, Carnegie Mellon University, 1996 a degradation model based on convolutional distortion and additive noise in time domain is proposed:

$$z(t)=x(t)*h(t)+n(t)$$

where z(t) is the noisy signal, x(t) is the target signal, h(t) represents the convolutional distortion and n(t) is the additive noise. However, this is not the problem that is actually to be solved. In fact, $$z(t)=x(t)*h_1(t)+y(t)*h_2(t)+n(t)$$

where y(t) is to the user. Note that the convolutional noise for the user and the suspect is different. This problem seems to be much more complex, but the close talk microphone signal, that only contains the user speech, and a previous training process could help to compensate $y(t)*h_2(t)$ in the feature domain. If each user has his own system, which is something that could happen in some situations, the training process can be very accurate. On the other hand, the estimation of the additive noise and the convolutional distortion for the suspect could be estimated on line by EM (Expectation Maximization) algorithm, so that no training process would be required.

Spectral subtraction (S. F. Boll, Suppression of Acoustic Noise in Speech using Spectral Subtraction, IEEE Trans. on ASSP, vol. 27(2), pp. 113.120, 1979) can be indicated as a solution based on frequency domain. Using the close talk, an estimation of the user speech in the far field microphone can be obtained and it can be used to extract the suspect speech signal.

Another option would be to use several microphones in the local device and provide a beamforming solution to capture the suspect speech. It could be sufficient not to record the user speech.

In step "MS/SID/ED" of the flow chart shown in FIG. 1 speaker identification is done by the server or the recording device. Reliable matching of features obtained for the speaker's utterance is a crucial point. Conventionally, scored N-best lists of candidates are generated in an open-set framework and a decision of an identified speaker is made based on the comparison of the highest score with some predetermined threshold. Thereby, a matching event is achieved.

A novel alternative way of speaker identification is proposed herein. According to this novel approach not only the maximum score s is considered but rather the distance of the same and the average (mean) μ of the rest of the scores is also considered. This distance is normalized by the standard deviation of the distribution of the rest of the scores σ to obtain d(s)=(s−μ)/σ. By means of the thus obtained distance and the highest score itself a two-dimensional parameter space (s, d(s)) is given and a discriminative model is trained over that two-dimensional parameter space in order to estimate the optimal hyperplane separation between non-target classes comprising samples of speakers that are not identical with the speaker whose utterance is detected by the local device and target classes comprising samples of that speaker. Thereby, a new score is obtained in from of the distance from the two dimensional pair of the highest score s and the distance d(s) to that hyperplane. Moreover, a third dimension can be taken into account given by the distance dd of the highest score s to the second highest score ss, dd=(s−ss)/σ.

In more detail:

Consider we have an open-set identification. So, we have to compare one audio against N models, so that N scores are obtained. We sort them and we take the highest one (s). We compute the mean and standard deviation with the rest of scores (μ and σ, respectively). We compute the relative distance between s and μ as: d=(s−μ)/σ. Then, we represent our highest score as a pair: (s,d).

Using a training database, we extract the corresponding pairs (s_train,d_train) for all the open-set identifications we can carry out and we train the best hyperplane to separate the two classes: target and non-target. A pair (s_train,d_train) is a target if the score s_train represents a target trial. The hyperplane can be trained using SVM (Support Vector Machines); see, for example, C. Cortes and V. Vapnik, "Support-Vector Networks", Machine Learning, 20, 1995.

Once we have trained the hyperplane using SVM, we can decide whether the pair (s,d) corresponds a target or not. It is done using the SVM framework. Usually SVM are used as a binary classificator, but in our case we will use it in other sense, also included in the SVM framework. Then, we compute the distance between the hyperplane and the pair (s,d). Note that it allows us to fix a working point (th) which can be modified by the user to be more restrictive when we take a decision. Thus, if the distance between (s,d) and the hyperplane is higher than th, the score s is not considered as a target and vice verse.

Although the pattern recognition framework proposed is SVM, other techniques could be applied, for example Gaussian Mixture Models (GMM).

Another critical point in the inventive method for speaker identification is the response time needed for speaker identification. In order to accelerate a decision on the identity of the target speaker a confidence level based decision might be employed. According to this approach, a decision is made when a score is determined up to some predetermined confidence level lower than 100%. In particular, if a confidence interval given by confidence values associated with a score determined (and changing) during a predetermined time period lies entirely below or above a predetermined threshold a decision on the identity of a speaker can be made after that predetermined time period rather than waiting for completion of the process of score determination after all features are completely evaluated (confidence level of 100%). This process is particularly suitable in the case of a single speaker verification.

The state of the art is based on Vogt, Robert J, and Sridharan, Sridha, "Minimising speaker verification utterance length through confidence based early verification decisions", in Proceedings of the third international conference on advances in Biometrics, 2-5 Jun. 2009, University of Sassari, Italy. However, this approach works only for comparisons of one testing audio with one speaker versus one model. Also, the solution cannot be applied directly to all the SID frameworks.

In the context of other SID approaches, the mean of the scores frame by frame is not a good estimator of the final score (it happens in UBM/GMM based SID, but not in Joint Factor Analysis, JFA or i-vector approaches). In that case, accumulative score along the frames would be a better estimator of the final score. In order to define the confidence level, short time standard deviation over the scores and a priori information can give a reasonable measure of the confidence interval.

Figure 2:
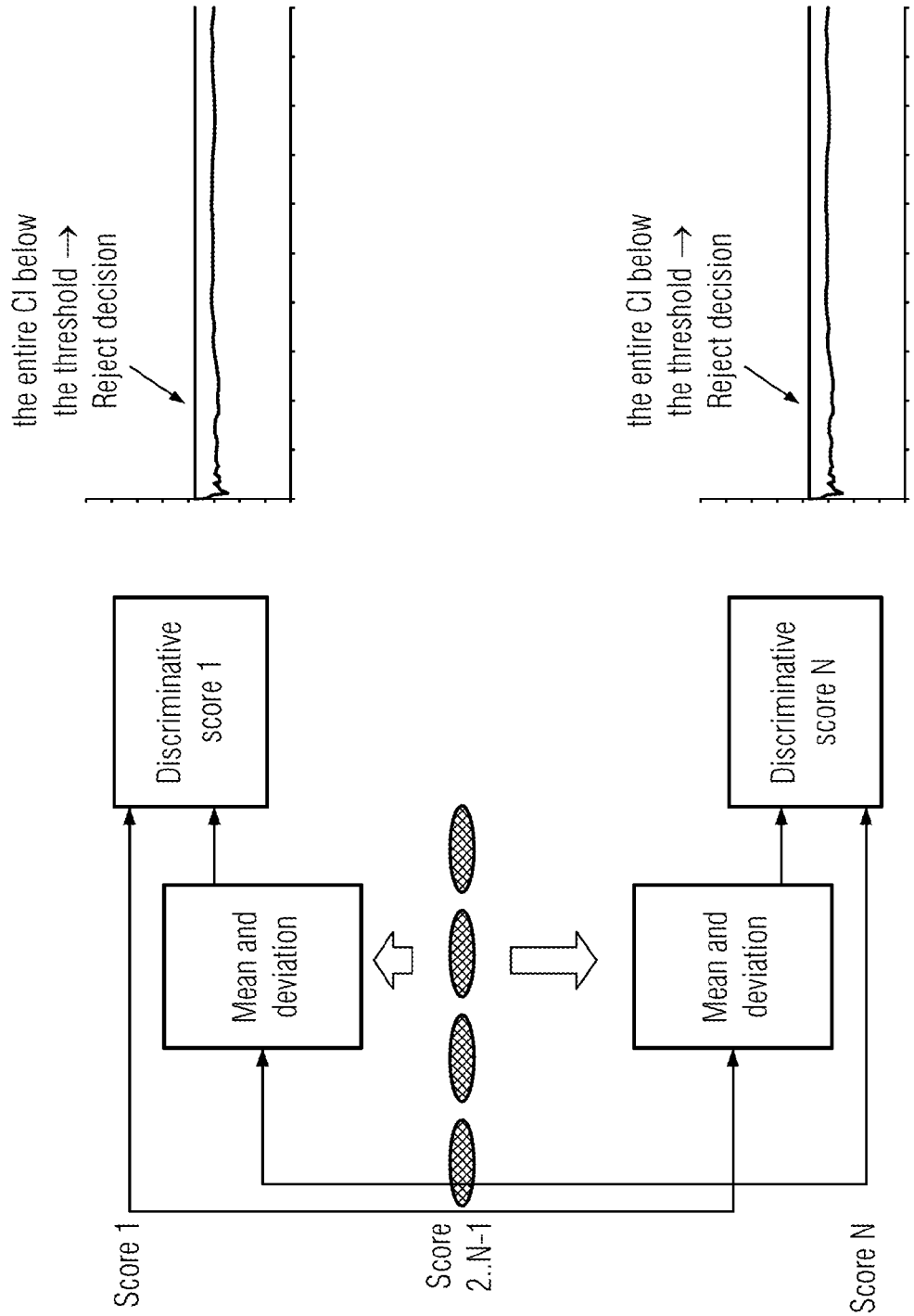
FIG. 2 illustrates a score and confidence based open-set speaker identification according to an example of the present invention.

In the context of an open-set speaker identification task, where a number of samples of acoustic features speaker are stored and it has to be found out whether the features that are extracted from the locally detected utterance of a target speaker match a stored sample, the score to be analyzed with respect to the confidence of the same can be chosen to be the above-described kind of score representing a distance of the two-dimensional score (s, d(s)) or three-dimensional score (s, d(s), dd(s)) to the hyperplane separation. During the matching process a single speaker identification score based on a temporarily best score might not converge due to the fact that the sample considered the best matching one may change from comparison to comparison instant during the matching process. Thus, each score assigned to a sample (scores 1 to N in FIG. 2) is treated as if it was the best score, i.e. the two-dimensional or three-dimensional score as described-above, is determined based on the mean average (mean) $\mu$ of the rest of the scores and the standard deviation of the distribution of the same as illustrated in FIG. 2. A final decision on the score is made when the confidence intervals related to all of the scores considered for the stored sample compared with the features of the utterance of the target speaker are above or below a predetermined threshold. In this case, an individual open-set speaker identification decision must be made for each stored speaker sample of interest that is stored in the database.

For further explanation of the employed confidence interval with respect to a threshold the following is noted. We have one estimation of one measure per time instant. Also, we have a confidence interval per time instant. We can think that the final value of the measure given one time instant will be around the estimation of the measure +/−the confidence interval. If we want to know if the final value is higher or lower than a threshold, we can assume that:

If the estimation+confidence interval<threshold=>we can assume that the final value will be lower than the threshold If the estimation−confidence interval>threshold=>we can assume that the final value will be higher than the threshold This is the concept of the early decision approach.

By the above-described two-dimensional or three-dimensional score the problem of more than one best matches that may occasionally occur can be mitigated. In such a case, the score with the higher hyperplane separation can be chosen as the relevant one for speaker identification.

Figure 3:
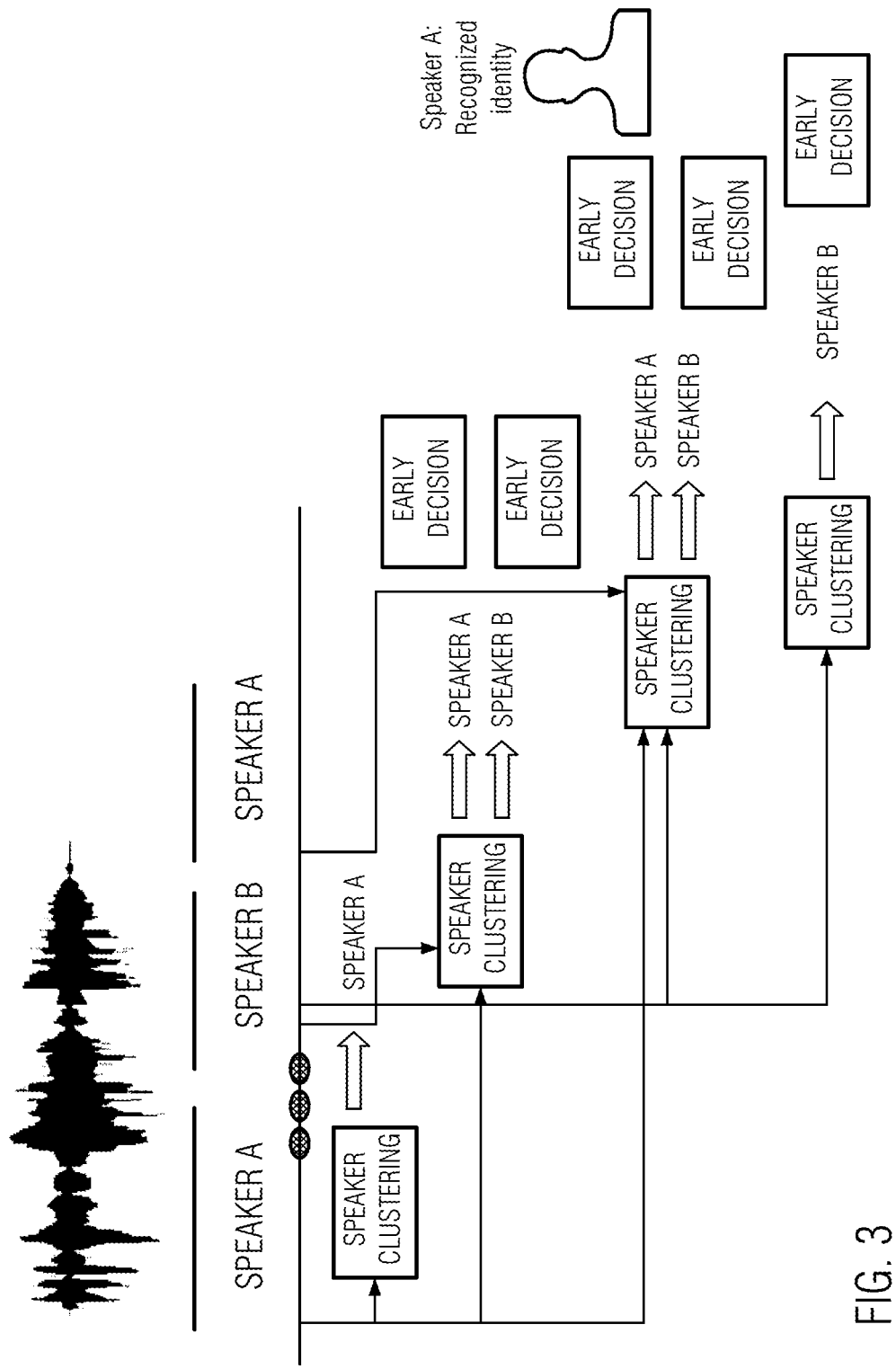
FIG. 3 illustrates a score and confidence based open-set speaker identification for an open-set multiple speaker scenario comprising speaker clustering.

As already mentioned above it might be desirable to remove speech detected from a user of the local device used for detection of the utterance of a target speaker. Nevertheless, speech inputs from additional speakers might be presented in the detected speech signal. Even in this case, early decision on a speaker's identification can be achieved based on confidence levels as it is illustrated in FIG. 3. In this case, before the early decision technique described with reference to FIG. 2 is employed (see box "EARLY DECISION" in FIG. 3) the scores have to be grouped according to each unknown speaker under test whose utterance is locally detected. If the time for determining a score is reduced during the matching process, it can be assumed that the corresponding features (speech sample) belong to one and the same speaker, otherwise a diarization module has to be applied before the clustering. In order to implement the clustering process more efficiently, speech segments assigned to an already identified speaker (say speaker A in FIG. 3) are no longer considered for the next clustering of the remaining speakers. In fact, if we extract segments of N seconds and N is reduced, we can assume that only one speaker is talking in the segment and only clustering process is needed. On the other hand, if N is high, we will have to assume that more than one speaker is talking in the segment and we will have to apply diarization to separate the speakers.

In order to group the scores according to each unknown speaker under test, different approaches according to different examples of the invention can be considered. Assuming that enough computational resources are available, a complete diarization system can be used to segment and cluster the speakers present in the detected utterance. This system runs every L seconds over the whole available utterance updating the diarization hypothesis, and the scores for every speaker in the database are recomputed for every new diarization hypothesis obtained and fed into the early decision methods, forgetting previous diarization hypotheses.

To make faster decisions, the diarization system can run every L seconds, over a window of N seconds, with N≥L (two consecutive windows may be overlapped). The diarization hypotheses obtained previously are kept, and the hypothetical speakers obtained are clustered before performing early decision, as shown in FIG. 3.

If the window of N seconds considered for the diarization system is small enough, we can remove the diarization system assuming that only a single speaker will be present in every window of N seconds. The clustering process is needed to group those windows containing the same speaker.

Finally, the clustering process could be removed. For every speaker in the database, only the best scores obtained for the whole utterance can be considered. As an example, the best scores can be sorted in descent order and fed into the early decision methods. If the confidence level for the best scores of a speaker is completely above or below the threshold, a decision can be made. When multi-speaker diarization is done, some quality measures can be computed and they can be provided to the user in order to improve the acquisition of the suspect speech.

All previously discussed embodiments are not intended as limitations but serve as examples illustrating features and advantages of the invention. It is to be understood that some or all of the above described features can also be combined in different ways.

What is claimed is:

1. A method for speaker identification, comprising:
detecting speech activity locally;
detecting a speaker's utterance locally;
selectively extracting features from the detected utterance locally to provide extracted features;
selectively encoding the extracted features locally to provide encoded extracted features;
selectively transmitting the encoded extracted features to a server;
decoding and analyzing, by the server, the received encoded extracted features to obtain information on the speaker's identification;
transmitting the information on the speaker's identification from the server to a location where the speaker's utterance was detected; and
decoding and analyzing the information on the speaker's identification received from the server to identify the speaker,
wherein at least one of (i) extracting the features locally, (ii) encoding the extracted features locally, and (iii) transmitting the encoded extracted features to the server, are only performed if speech activity is detected above a predetermined threshold.

2. The method according to claim 1, further comprising:
encoding parts of the speaker's utterance to provide encoded parts; and
transmitting the encoded parts to the server.

3. The method according to claim 1, wherein the speaker's utterance is locally detected by a mobile device, and
wherein the encoded extracted features are transmitted to the server by the mobile device.

4. The method according to claim 1, wherein the extracted features comprise MEL frequency cepstral coefficients.

5. The method according to claim 1, wherein the act of encoding the extracted features locally includes at least one of (i) vector quantization, and (ii) linear prediction.

6. The method according to claim 1, further comprising:
detecting babble noise locally;
selectively encoding parts of the speaker's utterance to provide encoded parts; and
selectively running an SID, and
wherein at least one of (i) extracting features from the detected utterance locally, (ii) running the SID, (iii) encoding the extracted features locally, (iv) transmitting the encoded extracted features to the server, and (v) transmitting the encoded parts to the server, are only performed if babble noise is detected below a predetermined noise threshold.

7. The method according to claim 1, wherein (i) detecting the speaker's utterance locally, (ii) extracting features from the detected utterance locally, and (iii) encoding the extracted features locally, are performed by a local device associated with a user, and further comprising:
canceling a verbal utterance of the user detected by the local device before extracting the features from the detected utterance.

8. The method according to claim 1, wherein analyzing the received extracted features by the server to obtain information on the speaker's identification comprises:
matching, by the sever, the received extracted features from parts of the speaker's utterance with samples stored in a database;
determining a maximum score for a best matching sample from among the samples stored in the database to which the received extracted features were matched;
determining a difference of (i) the maximum score, (ii) an average of other scores obtained from matching the received extracted features to other samples stored in the database besides the best matching sample, and (iii) a standard deviation of the other scores; and
identifying the speaker based on the determined difference of (i) the maximum score, (ii) the average of the other scores, and (iii) the standard deviation of the other scores.

9. The method according to claim 1, wherein analyzing the received extracted features by the server to obtain information on the speaker identification comprises:
matching at least one of the received extracted features from parts of the speaker's utterance with samples stored in a database;
determining scores for each of the matched samples; and
determining confidence levels for each of the determined scores,
wherein the process of determining a score for each of the matched samples is terminated if a confidence level associated with a determined score exceeds a predetermined confidence level threshold.

10. The method according to claim 8, further comprising:
detecting another speaker's utterance locally;
extracting features from the detected utterance of the other speaker locally to provide other extracted features;
encoding the other extracted features from the detected utterance of the other speaker locally to provide other encoded extracted features;
transmitting the other encoded extracted features from the detected utterance of the other speaker to the server; and
decoding and analyzing, by the server, the received encoded extracted features from the detected utterance of the other speaker to obtain information on the other speaker's identification, and
wherein the scores are grouped according to the speaker or the other speaker.

11. A system for speaker identification, comprising:
a local computing device configured to (i) detect speech activity locally; (ii) detect a speaker's utterance locally; (iii) selectively extract features from the detected utterance locally to provide extracted features; (iv) selectively encode the extracted features locally to provide encoded extracted features; and (v) selectively transmit the encoded extracted features,
wherein the local computing device is further configured to (i) extract features from the detected utterance locally, (ii) encode the extracted features locally, and (iii) transmit the encoded extracted features only if speech activity above a predetermined threshold is detected, and
a server configured to decode and analyze the encoded extracted features received from the local computing device to obtain information on the speaker's identification, and to transmit the information on the speaker's identification to the local computing device, and
wherein the local computing device is further configured to decode and analyze the information on the speaker's identification received from the server to identify the speaker.

12. The system according to claim 11, wherein the local computing device is a mobile device.

13. The system according to claim 11, wherein the local computing device and the server are incorporated as part of a call center.

\* \* \* \* \*